L. C. VANDERLIP.
MOTOR VEHICLE LOCK.
APPLICATION FILED NOV. 14, 1921.

1,432,503.

Patented Oct. 17, 1922.

INVENTOR
Louis C. Vanderlip.

Patented Oct. 17, 1922.

1,432,503

UNITED STATES PATENT OFFICE.

LOUIS C. VANDERLIP, OF ELKHART, INDIANA.

MOTOR-VEHICLE LOCK.

Application filed November 14, 1921. Serial No. 515,032.

*To all whom it may concern:*

Be it known that I, LOUIS C. VANDERLIP, a citizen of the United States, and a resident of the city of Elkhart, county of Elkhart, Indiana, have invented certain new and useful Improvements in Motor-Vehicle Locks, of which the following is a specification.

This invention relates to locking devices to prevent theft or unauthorized operation of automobiles, and especially to means for locking the steering wheel thereof in operative or inoperative position.

An object of the invention is the production of a steering wheel locking device which is applicable to motor cars of the Ford type in which planetary gearing is used in the steering head.

Another object is the production of a steering wheel locking device having planetary gearing and in which the center or driving pinion of the planetary gears may be meshed or demeshed therewith independent of the steering wheel, the latter being fixed against axial movement relative to the steering post. Other objects of my invention are mentioned and described herein.

Figure 1:
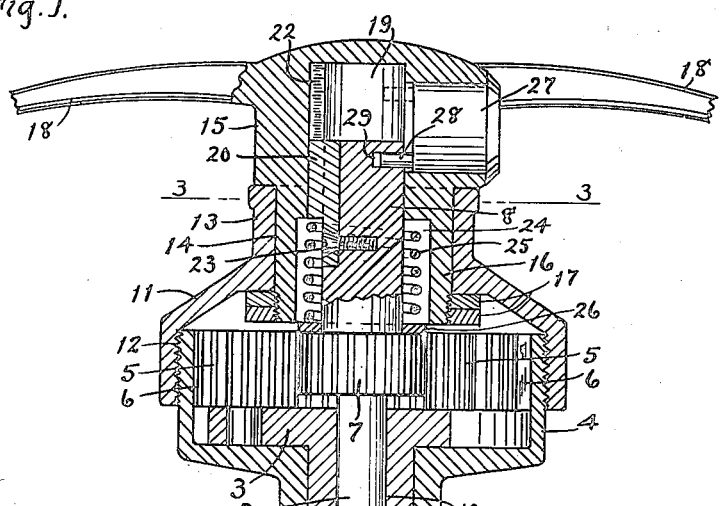
Figure 3:
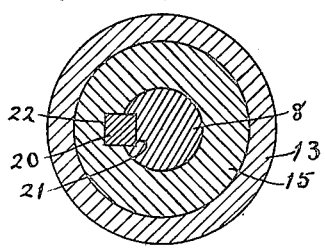
Figure 2:
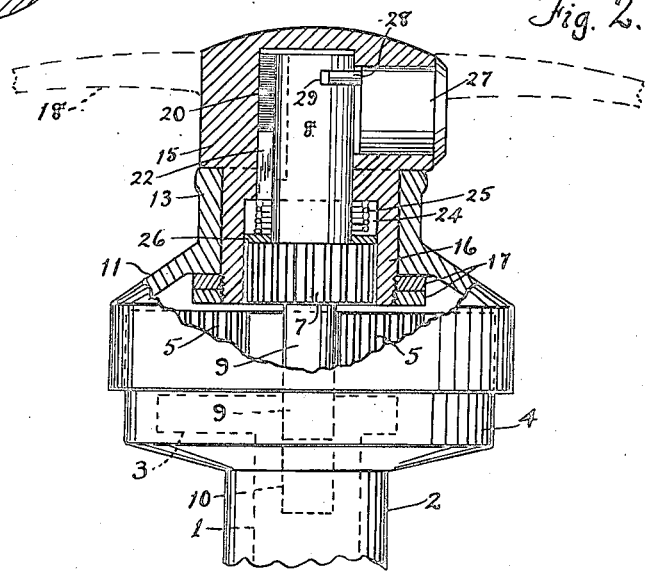

The preferred embodiment of my invention is illustrated in the accompanying drawing in which Figure 1 represents a vertical sectional view in which the planetary gearing is in the operative or driving position; Fig. 2 represents a view similar to Fig. 1 in which the center or driving pinion of the planetary gears is demeshed with the other gears; and Fig. 3 is a section taken on the line 3—3 of Fig. 1.

Similar numerals of reference indicate like parts in the several views on the drawing.

Referring to the details of the drawing, the numeral 1 indicates the steering post of a Ford motor car which post is rotatably mounted within the column 2, said post having the usual head 3 at the top end thereof, which head is disposed within the usual cylindrical lower casing 4 which is attached to the top end of the steering column 2.

Numerals 5, 5 indicate the usual pinions of the planetary gearing which are mounted upon the post head 3 in the usual, or any suitable, manner, which pinions mesh with the annular rack 6 formed on the inner periphery of the casing 4. The pinions 5, 5 mesh also with the centrally disposed driving pinion 7 which is rigid with the shaft 8, the lower end 9 of said shaft being journaled in the steering post head at 10 axially of the post 1. The numeral 11 indicates a casing cap which may be screw threaded to the exterior of the lower casing 4 at 12, which cap may have a bearing section 13 centrally bored at 14. The numeral 15 indicates a steering head, or steering wheel hub, provided with the reduced cylindrical bearing section 16 which is journaled for rotation within the cap section bore 14, the element 15 of said head engaging the end of the bearing section 13 to prevent downward endwise movement of the head. Numerals 17, 17 indicate a pair of nuts screw threaded upon the lower end of the head shaft portion 16, one of which may be a lock nut, to prevent upward movement of the steering head, one of which nuts may engage the inner surface of the cap 11.

The steering head 15 may be provided with a plurality of spider arms 18, 18 adapted to carry a circular wheel rim—not shown—as is well known in the art. The pinion shaft 8 is slidably arranged within a chamber 19 formed axially of and in the head element 15, said shaft being made rotative with said steering head by a key element 20 which may be rigidly fastened in the shaft slot 21, which key is slidably arranged in the upright slot 22 formed in the wall of the chamber 19. A screw 23 may secure the key 20 to the shaft 8.

The numeral 24 indicates a cylindrical pinion chamber formed in the lower end of the head shaft 16 axially of the post 1 and open at its lower end, said chamber being of sufficient diameter to admit the pinion 7 thereto when the shaft 8 is upwardly moved, as hereinafter described. The numeral 25 indicates a coil spring disposed within the chamber 24 around the shaft 8 and bearing against the washer 26 to exert a thrust downwardly on the shaft 8 to maintain the pinion 7 in mesh with the gears 5, 5.

A lock 27 is mounted in the head 15 and provided with a pin 28, which pin is connected with the revoluble key barrel of the lock, as is well known in the art, said pin projecting outward into engagement with the transverse slot 29 formed in the upper end of the shaft 8, whereby said shaft may be elevated within the chamber 19 when the key barrel of said lock is rotated by the operator.

When disconnection of the steering gear is desired the shaft 8 is elevated to the position indicated in Fig. 2 of the drawing, whereby the driving pinion 7 is demeshed with the planetary gearing and disposed within the chamber 24, in which position of said shaft the lower end 9 thereof is journaled within the upper end of the post bore 10. Removal of the key from the lock 27, after elevation of the shaft 8 and pinion 7, as described, locks said members in the elevated position, thereby causing the head 15 to be wholly disconnected with the steering post 1.

When the car operator desires to again connect the steering head 15 with the steering gear, the key is inserted in the lock 27, thereby releasing the key barrel thereof for rotation, and the coil spring 25 urges the shaft 8 downward, whereby the pinion 7 is again put in mesh with the gears 5, 5.

I claim:

1. The combination with a motor vehicle steering mechanism having planetary gearing operatively connected with the steering post of the vehicle, of a casing for said planetary gearing; a steering head rotatably mounted in said casing and fixed against endwise movement relative to the steering post; and a driving pinion mounted within the casing and rotative with said steering head, said pinion being movable axially of said steering head and independently thereof and into and out of mesh with said planetary gearing and adapted to be releasably locked in the demeshed position.

2. The combination with a motor vehicle steering mechanism having planetary gearing operatively connected with the steering post of the vehicle, of a casing for said planetary gearing; a steering head rotatably mounted in said casing and fixed against endwise movement relative to the steering post; and a spring pressed driving pinion mounted within the casing and rotative with said steering head, said pinion being movable axially of said steering head and independently thereof and into and out of mesh with said planetary gearing; and means for releasably locking the driving pinion in the demeshed position.

3. The combination with a motor vehicle steering mechanism having planetary gearing operatively connected with the steering post of the vehicle, of a casing for said planetary gearing; a chambered steering head rotatably mounted in said casing and fixed against endwise movement relative to the steering post; and a driving pinion mounted within the casing and rotative with said steering head, said pinion being movable axially of said steering head and independently thereof and into and out of mesh with said planetary gearing, and into and out of said steering head chamber; and means for releasably locking the driving pinion in the demeshed position.

4. The combination with a motor vehicle steering mechanism having planetary gearing operatively connected with the steering post of the vehicle, of a casing for said planetary gearing; a chambered steering head rotatably mounted in said casing and fixed against endwise movement relative to the steering post; and a spring pressed driving pinion mounted within the casing and rotative with said steering head, said pinion being movable axially of said steering head and independently thereof and into and out of mesh with said planetary gearing, and into and out of said steering head chamber; and means for releasably locking the driving pinion in the demeshed position.

5. In a vehicle lock, in combination, a steering post; a casing mounted relatively to the post; driven gears within said casing for actuating said steering post; a steering head rotatably mounted in said casing and fixed against endwise movement relative to said steering post; and a driving pinion in mesh with said driven gears and rotative with said steering head, said pinion being movable axially of said steering head and independently thereof and into and out of mesh with said driven gears; and means for releasably locking the driving pinion in the demeshed position.

6. The combination with a motor vehicle steering mechanism having planetary gearing operatively connected with the steering post of the vehicle, of a casing for said planetary gearing; a steering head rotatably mounted in said casing and fixed against endwise movement relative to the steering post; a spring pressed driving pinion in mesh with said planetary gearing and rotative with said steering head; and means for shifting said driving pinion out of mesh with said planetary gears; and means for releasably locking the driving pinion in the demeshed position.

7. The combination with a motor vehicle steering mechanism having planetary gearing operatively connected with the steering post of the vehicle, of a casing for said planetary gearing; a steering head rotatably mounted in said casing and fixed against endwise movement relative to the steering post; a driving pinion in mesh with said planetary gearing and rotative with said steering head, said pinion being movable axially of said steering head and independently thereof and into and out of mesh with said planetary gearing; and lock controlled means for shifting said driving pinion out of mesh with said planetary gears.

8. The combination with a motor vehicle steering mechanism having planetary gearing operatively connected with the steering post of the vehicle, of a casing for said planetary gearing; a steering head rotatably mounted in said casing and fixed against endwise movement relative to the steering post; a driving pinion in mesh with said planetary gearing and rotative with said steering head, said pinion being movable axially of said steering head and independently thereof and into and out of mesh with said planetary gearing; and lock actuated means for shifting said driving pinion out of mesh with said planetary gears.

9. In vehicle steering mechanism, the combination with a steering post, a casing mounted relatively to said post, a planetary gearing in said casing, of a steering head rotatively mounted in said casing and fixed against endwise movement relative to said post; a driving pinion in mesh with said planetary gearing; and a mount for said driving pinion, said mount and pinion being rotative with said steering head and movable axially and independently thereof, whereby said driving pinion may be shifted into and out of mesh with said planetary gearing; and means for releasably locking the driving pinion in the demeshed position.

10. In vehicle steering mechanism, the combination with a steering post, a casing mounted relatively to said post, a planetary gearing in said casing, of a steering head rotatively mounted in said casing and fixed against endwise movement relative to said post; a spring pressed driving pinion in mesh with said planetary gearing; and a mount for said driving pinion, said mount being rotative with said steering head and independently movable longitudinally with respect to the axis of said steering post, whereby said driving pinion may be shifted out of mesh with said planetary gearing; and means for releasably locking the driving pinion in the demeshed position.

11. In vehicle steering mechanism, the combination with a steering post, a casing mounted relatively to said post, and planetary gearing in said casing, of a steering head rotatively mounted in said casing and fixed against endwise movement relative to said post; a driving pinion movably mounted within said casing and rotative with said steering head; a key controlled lock; and means operatively connecting said lock with said driving pinion, whereby, when said lock is actuated, said pinion is moved axially of said steering head and independently thereof into and out of mesh with said planetary gearing.

12. In vehicle steering mechanism, the combination with a steering post, a casing mounted relatively to said post, and planetary gearing in said casing, of a steering head rotatively mounted in said casing and fixed against endwise movement relative to said post; a spring pressed driving pinion movably mounted within said casing and rotative with said steering head; a key controlled lock; and means operatively connecting said lock with said driving pinion, whereby, when said lock is actuated, said pinion is moved axially of said steering head and independently thereof into and out of mesh with said planetary gearing.

13. In vehicle steering mechanism, the combination with a steering post, a casing mounted relatively to said post, and a planetary gearing in said casing, of a chambered steering head rotatively mounted in said casing and fixed against endwise movement relative to said post; a driving pinion movably mounted within the casing and rotative with said steering head; a key controlled lock; and means operatively connecting said lock with said driving pinion whereby, when said lock is actuated, said pinion is moved axially of said steering head and independently thereof into and out of mesh with said planetary gearing and into and out of said steering head chamber.

14. In vehicle steering mechanism, the combination with a steering post, a casing mounted relatively to said post, and a planetary gearing in said casing, of a chambered steering head rotatively mounted in said casing and fixed against endwise movement relative to said post; a spring pressed driving pinion movably mounted within the casing and rotative with said steering head; a key controlled lock; and means operatively connecting said lock with said driving pinion whereby, when said lock is actuated, said pinion is moved axially of said steering head and independently thereof into and out of mesh with said planetary gearing and into and out of said steering head chamber.

In witness whereof I have hereunto affixed my signature this 12th day of November, 1921.

LOUIS C. VANDERLIP.